 United States Patent [19]

Appel et al.

[11] 4,334,434
[45] Jun. 15, 1982

[54] ULTRASONIC FLOW RATE METER

[75] Inventors: Jean G. Appel, Le Plessis Robinson; Francois M. Dunand, Paris, both of France

[73] Assignee: Office National d'Etudes et de Recherches Aerospatiales O.N.E.R.A., Chatillon, France

[21] Appl. No.: 138,580

[22] Filed: Apr. 8, 1980

[30] Foreign Application Priority Data

Apr. 11, 1979 [FR] France ............... 79 09207

[51] Int. Cl.³ ............................... G01F 1/66
[52] U.S. Cl. ................................ 73/861.29
[58] Field of Search ..................... 73/861.29

[56] References Cited

U.S. PATENT DOCUMENTS 3,918,304 11/1975 Abruzzo et al. ............... 73/861.29

FOREIGN PATENT DOCUMENTS 2281571 3/1976 France ..................... 73/861.29

Primary Examiner—Charles A. Ruehl
Attorney, Agent, or Firm—A. A. Saffitz

[57] ABSTRACT

Device for measuring the speed of a fluid in a tube which comprises two ultrasonic electro-acoustic transducers in the tube; means for energizing these transducers by first and second transmit pulse groups; means for receiving first and second receive pulse groups at the transducer output; means for measuring a first delay between the start of the first transmit pulse group and the start of the first receive pulse group and a second delay between the start of the second transmit pulse group and the start of the second receive pulse group; and means for measuring a third delay between the starts of the first and second receive pulse groups. The flow rate is proportional to the quotient of the third delay by the product of the first and second delays. These delays comprise an integer delay part which is measured by clock pulses counting and fractional delay parts which are measured by constant current integrators.

3 Claims, 6 Drawing Figures

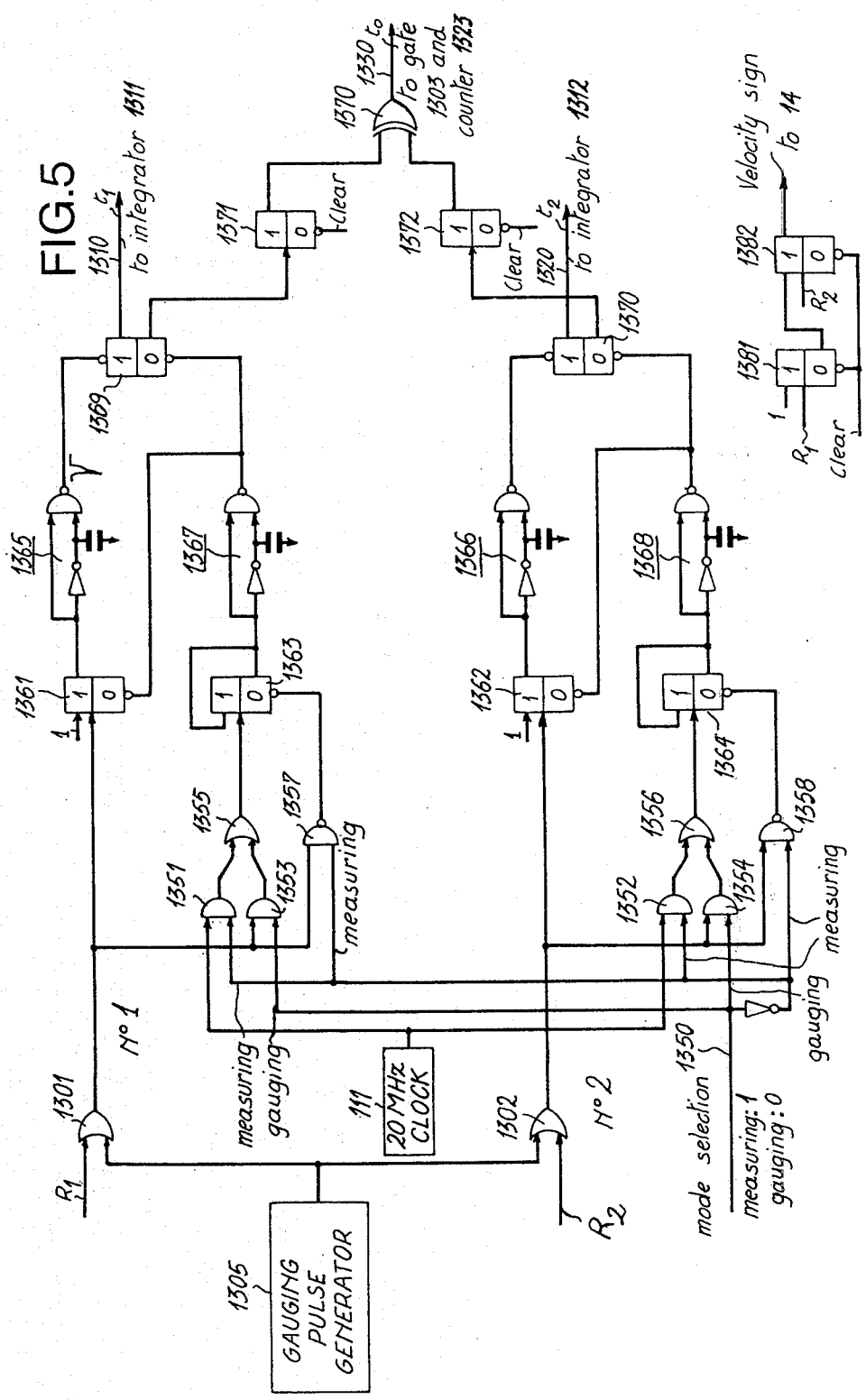

ULTRASONIC FLOW RATE METER

BACKGROUND OF THE INVENTION

1. Field of the Invention

This invention relates to an ultrasonic flowmeter for a fluid in a tube and, more particularly for liquids, affording a high level of accuracy over a wide flow-rate and also suitable for measuring small flow-rates.

2. Description of the Prior Art

Ultrasonic flowmeters are already known, particularly through French Pat. No. 2,281,571 (74-27312) filed Aug. 6, 1974, wherein two electroacoustic transducers in a tube are opposed along an axis oblique with respect to the axis of the tube in which the fluid whose speed or flow-rate is to be measured moves. Upon transmission, a pulse train of recurrence frequency $f_e$, of around 5 MHz for example, and of period $t_e$ is sent to the two transducers simultaneously. During this time, the electronic receiver circuits are blocked. At the end of the transmission, the electronic receiver circuits related to the two transducers are switched to reception. These circuits, including amplifiers, comparators and frequency dividers, restore the shape of the signals received and divide the frequency of these pulses by a factor d so as to deliver a train of p pulses of recurrence frequency $f_e/d = 1/t_r$.

The two pulse trains received, $R_1$ and $R_2$, after division of their frequency by d are characterized by the delay $T_1$ of reception train $R_1$ with respect to the transmission train and the delay $T_2$ of reception train $R_2$ with respect to the transmission train. The difference $T = \pm(T_1 - T_2)$ i.e. that between received pulse trains $R_1$ and $R_2$ is measured. This delay is the same for each of the pulses of the two trains taken two by two. It is thus possible to make up a signal R formed of p pulses of width T. The advantage of having p pulses lies in the fact that the uncertainties on the rise and fall times of these pulses can be reduced by summation in so far as these uncertainties are not correlated with the signal. The speed V of the flow is then given by:

$$V = (KT/T_1 T_2) \quad (1)$$

where K is a coefficient dependent on the dimensions of the tube and the nature of the fluid.

Pulse trains $R_1$ and $R_2$ are produced by electronics described in the aforementioned patent. Delays T, $T_1$ and $T_2$ appearing in equation (1) are measured using constant-current analog integrators providing voltages proportional to these delays and the speed is calculated analogically from voltages proportional to T, $T_1$ and $T_2$ respectively.

The drawback of the flowmeter of the prior art is that its components have limited accuracy and are prone to drifting chiefly caused by the temperature. More specifically, the logic circuits used in the two reception channels can never be strictly identical. It is therefore desirable to take into account the fact that these two channels do not introduce equal delays in signals received but present a differential delay.

SUMMARY OF THE INVENTION

In accordance with the invention, for measuring this differential delay, the emission signal is not only sent to the two transducers but also to the two reception channels of the processing electronics. Since the emission is performed on the two channels with a zero or known delay, the differential delay sought is deducted from the delay measured.

Delays $T_1$ and $T_2$ whose nominal values are of the order of 100 µs are measured by pulse counting using a 20 MHz clock. Delay T of a nominal value of about 1 µs is measured partly using the 20 MHz clock and partly using analog integrators. An interval $t_1$, of length $t_1$, begins at the rise time of interval T, of length T, and finishes at the first clock pulse or, more generally, the $n^{th}$ clock pulse which follows. An interval $t_2$, of length $t_2$, begins at the fall time of T and finishes at the first clock pulse or, more generally, the $n^{th}$ clock pulse which follows. An interval $t_0$, of length $t_0$, begins at the fall time of $t_1$ and finishes at the fall time of $t_2$. Interval $t_0$, whose length is strictly equal to an integer number of clock periods, is measured by counting the pulses delivered by the said clock. The intervals of length $t_1$ and $t_2$ are measured using constant-current analog integrators whose output values are then digitized.

The length of interval T is then:

$$T = t_0 + t_1 - t_2 \quad (2)$$

The part $t_0$ of duration T will be called integer duration part since it is equal to an integer number of clock periods and the parts $t_1$ and $t_2$ will be called fractional duration parts since they are equal to fractional numbers of clock periods.

It will be noted that intervals $t_1$ and $t_2$ finish either at the first or at the $n^{th}$ clock pulses which follow. By having them finish at the second clock pulses which follow the rise time and fall time of T, the result is that intervals $t_1$ and $t_2$ have a minimum width equal to one period of the basic 20 MHz clock. The constant-current integrators which measure $t_1$ and $t_2$ thus never function in the vicinity of zero but rather in a zone where they are linear.

The two constant-current integrators which measure widths $t_1$ and $t_2$ are periodically and automatically calibrated making use of intervals of known width. This makes it possible, in the calculations, to take account in real time of the zero shift and the difference in gain of these analog integrators.

A mini-computer is incorporated in the flowmeters electronics for fulfilling the following main functions:
synchronization of the various measurement phases (transmission, reception, calibration);
acquisition of the measurement data corresponding to:
  the differential delay between channels,
  the calibration of the integrators,
  the measurement itself;
calculation in real time of the speeds or flow-rates with correction of the previously mentioned shortcomings; possibility of integration of the flowrate to give a measurement of the volume flowed;
digital display of the calculation results on the equipment front face and digital output of these same values for recording, if need be.

BRIEF DESCRIPTION OF THE DRAWINGS

The invention will be now described in detail with reference to the accompanying drawings in which:

FIG. 5 is a detailed diagram of the electronics of the circuit forming pulses $t_0$, $t_1$ and $t_2$ included in the diagram of FIG. 4.

DESCRIPTION OF THE PREFERRED EMBODIMENT

The following reference letters will be used in this specification:

V: Fluid speed sought;
K: Overall constant used for the speed calculation;
$T_1$: Corrected delay between transmit train No. 1 and receive train No. 1;
$T_2$: Corrected delay between transmit train No. 2 and receive train No. 2;
T: Corrected delay between the two receiver trains;
$\Delta_t$: Period of the clock used for measuring the delays;
r: Number of clock periods' shift between the two transmit trains;
$N_1$: Number of clock pulses counted for measuring $T_1$;
$T_e$: Shift measured between the two trains upon transmission;
$T_r$: Shift measured between the two trains upon reception;
$n_r$: Number of clock periods $\Delta t$ counted for measuring p intervals of width $T_r$;
$t_{or}$: $(n_r/p) \Delta t$
$n_e$: Number of clock periods $\Delta t$ counted for measuring p intervals of width $T_e$;
$t_{oe}$: $n_e/p \Delta t$
$\sigma_e$: Sign of the delay between the two transmit trains;
$\sigma_r$: Sign of the delay between the two receive trains;
$t_{1r}$: Time elapsed between the rise time of $T_r$ and the second clock pulse which follows;
$t_{2r}$: Time elapsed between the fall time of $T_r$ and the second clock pulse which follows;
$t_{1e}$: Time elapsed between the rise time of $T_e$ and the second clock pulse which follows;
$t_{2e}$: Time elapsed between the fall time of $T_e$ and the second clock pulse which follows;
$U_{1e}$: Output voltage of the first integrator unblocked for a time $t_{1e}$;
$U_{2e}$: Output voltage of the second integrator unblocked for a time $t_{2e}$;
$U_{1r}$: Output voltage of the first integrator unblocked for a time $t_{1r}$;
$U_{2r}$: Output voltage of the second integrator unblocked for a time $t_{2r}$;
$U_{1m}$: Output voltage of the first integrator unblocked during p calibrating intervals;
$U_{1M}$: Output voltage of the first integrator unblocked during 2p calibrating intervals;
$U_{2m}$: Output voltage of the second integrator unblocked during p calibrating intervals;
$U_{2M}$: Output voltage of the second integrator unblocked during 2p calibrating intervals.

Figure 1:
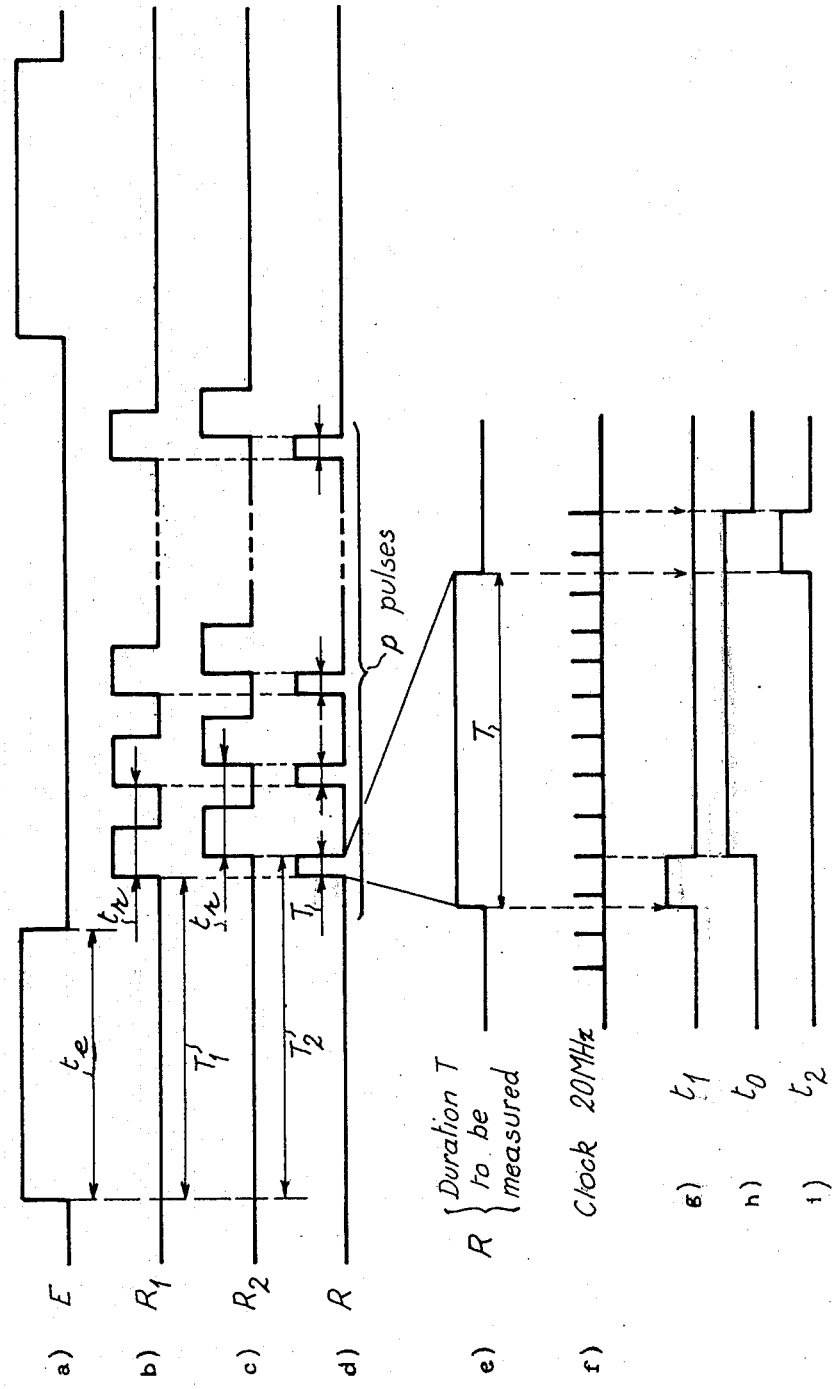
FIG. 1 is a signal diagram giving an explanation of the measurement of the duration T of pulses R.

Line a on FIG. 1 shows transmit pulse train E of width $t_e$. Line b depicts pulse train $R_1$ of period $t_r = d/f_e$ received by the first transducer and which presents a delay $T_1$ from the transmit pulse train and line c, pulse train $R_2$ of period $t_r = d/f_e$ received by the second transducer and which presents a delay $T_2$ from the transmit pulse train.

Line d of FIG. 1 depicts p pulses R of width T obtained by subtracting signals $R_1$ and $R_2$. Line e gives a pulse of group R suitably enlarged and lines f to i respectively represent the clock pulses, pulse $t_1$ whose front edge coincides with the rise time of pulse R and rear edge with the second clock pulse following the latter rise time, pulse $t_2$ whose front edge coincides with the fall time of pulse R and rear edge with the second clock pulse following the latter fall time, and pulse $t_0$ whose front edge coincide with the rear edge of pulse $t_1$ and rear edge with the rear edge of pulse $t_2$.

Figure 2:
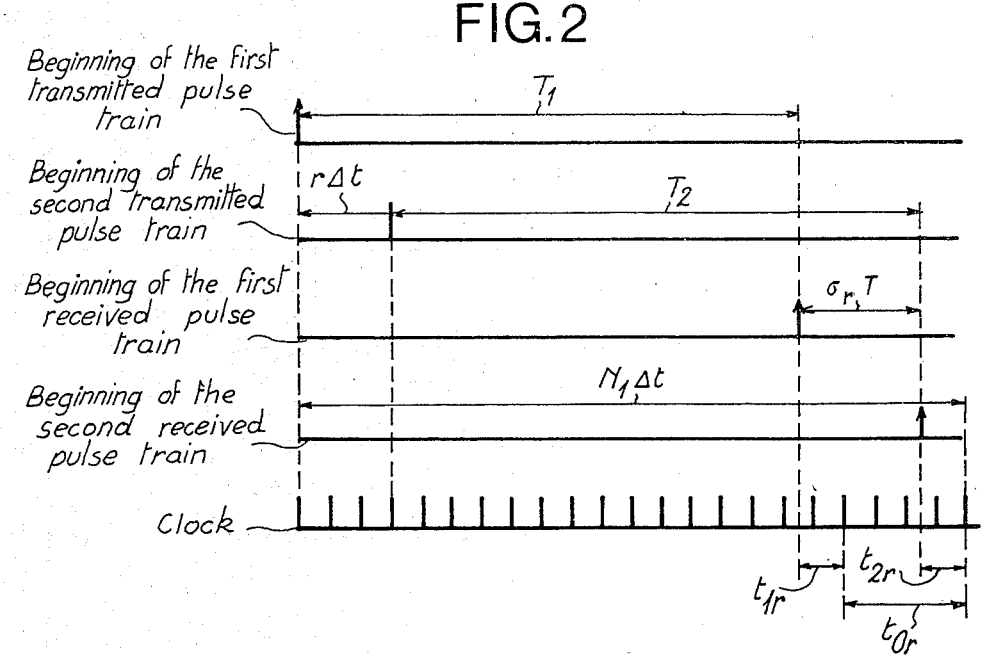
FIG. 2 is a signal diagram giving an explanation of the measurement of durations $T_1$ and $T_2$ of the respective delays of pulses $R_1$ and $R_2$ from the transmission train.

In FIG. 2, it has been assumed that the transmit pulse trains of the two transducers do not coincide and are set off by $r\Delta t$. The beginnings of the first transmit pulse train the second transmit pulse train the first receive pulse train and the second receive pulse train have been represented.

From FIG. 2 it can be seen that:

$$T_1 = N_1 \Delta t - t_{2r} - \sigma_r T \quad (3)$$

$$T_2 = T_1 + \sigma_r T - r \Delta t \quad (4)$$

$T_1$ and $T_2$ are thus known once T and $t_{2r}$ have been found. The equations for these two quantities are given hereinafter.

The delay stemming from the shift between two transmit channels is equal to $r\Delta t$ increased or decreased by a delay between channels inherent in the electronics and that is designed by $T_\epsilon$. This gives:

$$T_e = r\Delta t + T_\epsilon$$

$$T_r = r\Delta t + T_\epsilon + T$$

whence:

$$T = T_r - T_e$$

$T_r$ and $T_e$ are given by the equations:

$$T_r = (n_r/p) \Delta t + \sigma_r (t_{1r} - t_{2r}) \quad (5)$$

$$T_e = (n_e/p) \Delta t + \sigma_e (t_{1e} - t_{2e}) \quad (6)$$

$t_{1r}$, $t_{2r}$, $t_{1e}$ and $t_{2e}$ remain to be expressed in terms of the voltages delivered by the two integrators.

Figure 3:
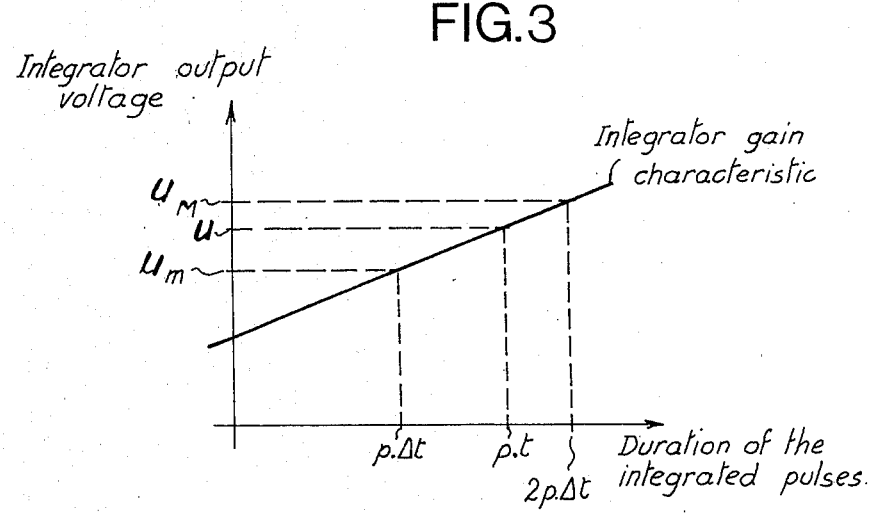
FIG. 3 is a signal diagram giving an explanation of the measurement of certain quantities appearing in the equations developed for $T_1$, $T_2$ and $T$.

FIG. 3 illustrates the gain plot for the integrators and voltages $U_m$, U, $U_M$ obtained after integration durations $p\Delta t$, pt, $2p\Delta t$. From FIG. 3, it can be seen that:

$$t_{1e} - t_{2e} = \Delta t \left[ \frac{U_{1e} - U_{1m}}{U_{1M} - U_{1m}} - \frac{U_{2e} - U_{2m}}{U_{2m} - U_{2m}} \right] \quad (7)$$

$$t_{1r} - t_{24} = \Delta t \left[ \frac{U_{1r} - U_{1m}}{U_{1M} - U_{1m}} - \frac{U_{2r} - U_{2m}}{U_{2M} - U_{2m}} \right] \quad (8)$$

$$t_{2r} = \Delta t \left[ 1 - \frac{U_{2e} - U_{1m}}{U_{1M} - U_{1m}} \right] \quad (9)$$

Figure 4A:
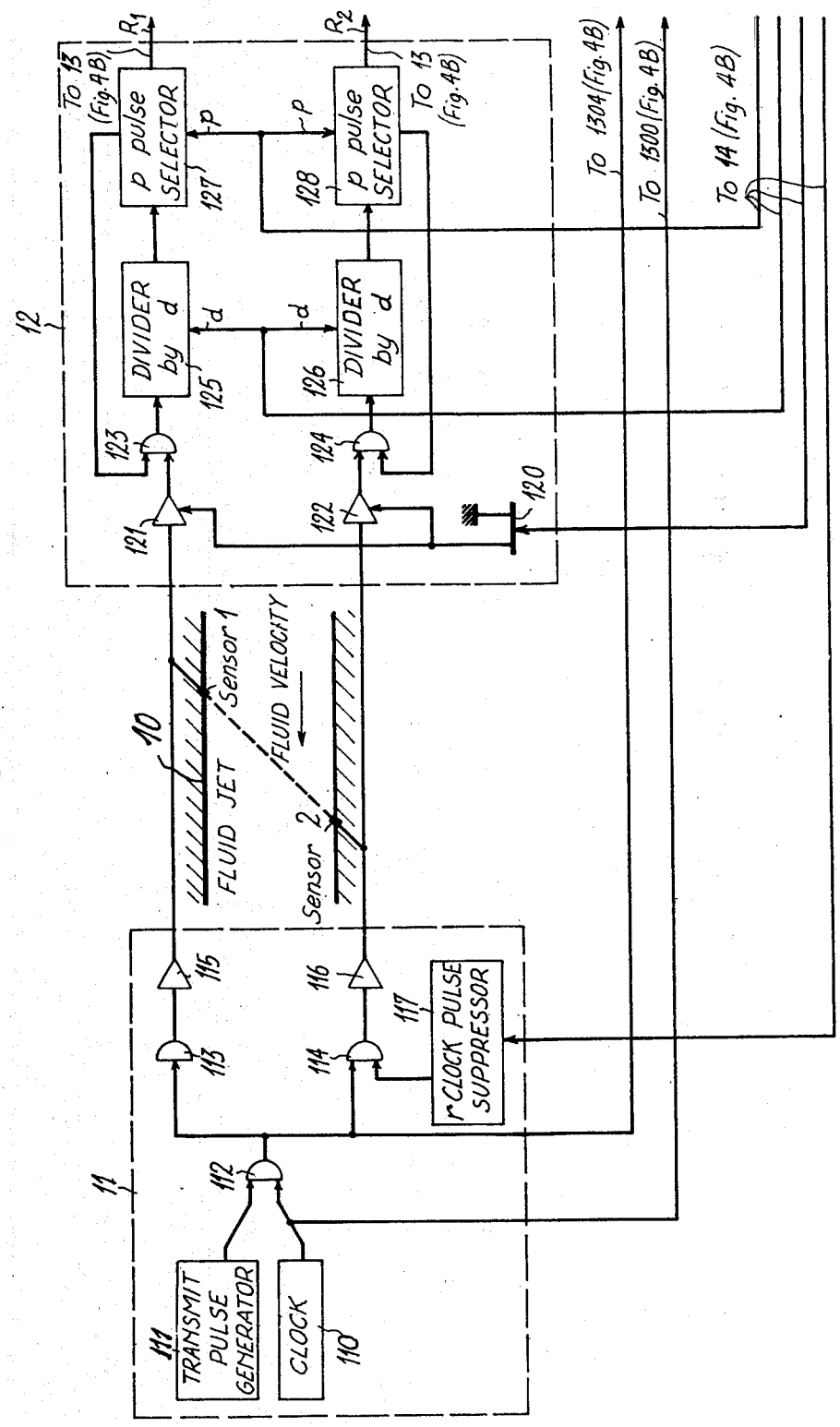
FIGS. 4A and 4B constitute a block diagram of the flowmeter of this invention.

With reference now to FIG. 4A, transmitter 11 includes a clock 110 having the frequency of 20 MHz, for example, and a generator 111 of large pulses at the frequency of 1000 pulses per second. These large pulses and the clock pulses are applied to an AND gate 112 whose output is connected to two AND gates 113 and 114, themselves linked to two amplifiers 115 and 116 which feed transducers or electro-acoustic sensors 1 and 2 placed in stream 10 whose speed is to be measured.

An inhibitor-interval generator 117 producing intervals of length $r\Delta t$ in phase with those intervals produced by generator 111 is connected to AND gate 114. Thus, r pulses on one of the pulse trains can be done away with, thereby enabling a known delay between the two emission trains to be introduced. In this way, for very low flow-rates, approaching zero, the electronic equipment does not function in the region of zero and consequently, no ambiguity can arise as to the sign of the speed measured.

Receiver 12 comprises two amplifiers 121 and 122 which receive the transmit and receive signals. A gain setting switch, for example a field effect transistor 120 controlled by a logic signal, makes it possible to give amplifiers 121 and 122 a low gain when they acquire the transmission signals and a high gain when they acquire the receive signals since the transmitted signals are of an amplitude considerably larger than the signals received as a result of the attenuation due to the fluid traversed.

The fact that the receiver amplifiers also receive the transmit signals enables, as it has been stated, the differential delay introduced by the two measurement channels on the signals received to be appraised. Since the two channels receive the transmit signals in phase or with a predetermined phaseshift, the measurement of the delay should theoretically be zero, or should have a predetermined value equal to the differential delay. As a result of the delays introduced by the logic circuits, this is not true and the measurement made allows the differential delay $T_\epsilon$ between the two channels to be evaluated.

Amplifiers 121 and 122 are connected to AND gates 123 and 124 respectively, which are in turn connected to frequency dividers 125 and 126 respectively, which divide by d the duration of the pulses received and these frequency dividers are connected to interval-number selectors 127 and 128 respectively, which determine the number p of transmit and receive intervals taken into consideration. Interval-number selectors 127 and 128 are connected to AND gates 123 and 124 to control the closing thereof once p pulses have been received.

Signals $R_1$ and $R_2$ of FIG. 1 appear at the outputs of selectors 127 and 128.

The reception circuit consequently has the first object of dividing the recurrence frequency of the two trains of signals received by a factor d such that the delay between the two trains $R_1$ and $R_2$ be produced several times. This delay T should be less than half the period of the signal $R_1$ or $R_2$ after division. The reception circuit has a second object of selecting a number p of intervals over which the measurement of delay T will be carried out.

For the measurement of width $T_1$, output signals $R_1$ and $R_2$ of receive circuit 12 are applied to a circuit 1300 (FIG. 4B) of processing circuit 13, via OR gates 1301 and 1302. Circuit 1300 substracts signals $R_1$ and $R_2$ to form signal R. It receives the clock pulses and produces groups of p pulses $t_0$, $t_1$, $t_2$ of respective width $t_0$, $t_1$, $t_2$, on wires 1330, 1310, 1320 respectively. Fractional duration pulses $t_1$ are applied to an integrator 1311 and fractional duration pulses $t_2$ to an integrator 1312. These two integrators are connected to analog-digital converters 1321 and 1322 respectively. p integer duration pulses $t_0$ are applied to an AND gate 1303 which also receives the clock pulses. Those clock pulses which pass AND gate 1303 during p pulses or intervals $t_0$ are counted in counter 1323. Therefore, the integer duration part of T is digitally counted and the fractional duration parts of T are measured by analog integration.

For measuring delay $T_1$, signal E and signal $R_1$ are applied to $T_1$ shaper circuit 1304 which may be a simple bistable flip-flop. The interval of width $T_1$ thus formed is applied to an AND gate 1314 at the same time as the clock pulses and these pulses are counted in counter 1324.

Quantities $pU_1$, $pU_2$, n and $N_1$ thus appear at outputs 131, 132, 133, 134 of circuits 1321, 1322, 1323, 1324. These four circuits are connected to a micro-processor 14 which consequently receives $pU_{1e}$, $pU_{2e}$, $n_e$ or $pU_{1r}$, $pU_{2r}$, $n_r$, depending on whether it is in the emission or reception period and calculates quantities $T_1$, $T_2$, $T_r$, $T_e$ and T as per equations (3), (4), (6), (7) and (5) respectively.

Figure 4B:
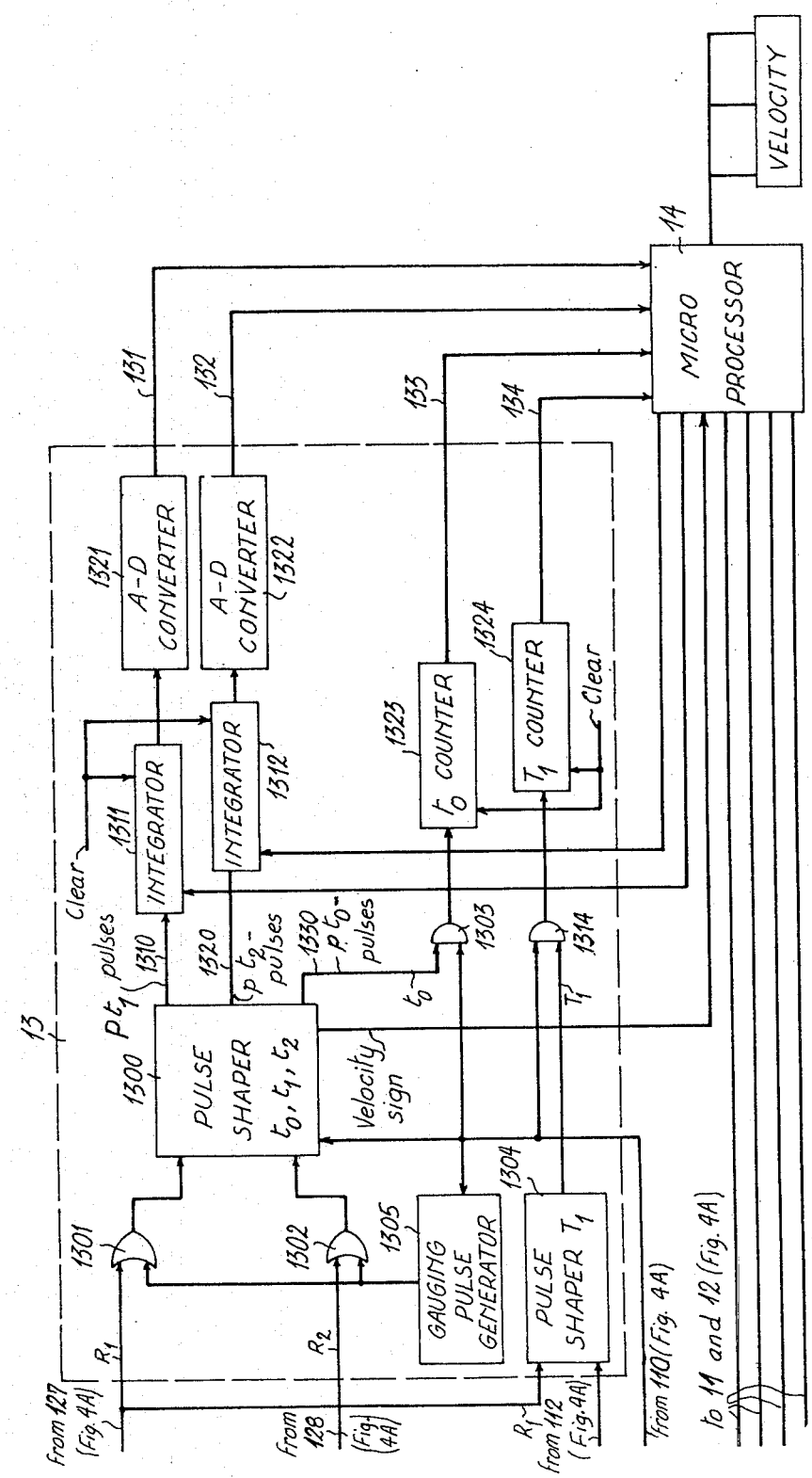

FIG. 4B depicts furthermore, a calibration-interval or gauging pulse generator 1305 making it possible to substitute trains of gauging pulses of predetermined width for trains of pulses $R_1$ and $R_2$, wherein one of the trains of predetermined width pulses includes p pulses and the second, 2p pulses. Since these gauging pulses have a known width, they allow the determination of two points on the gain characteristic line in FIG. 3 of the constant-current integrators. The current in integrators 1311 and 1312 is adjusted by the gain controls they comprise in terms of the number p of pulses of the transmit and receive trains.

FIG. 5 gives a detailed representation of circuit 1300 which forms the integer duration part of T and the fractional duration parts of T, i.e. pulses $t_0$, $t_1$ and $t_2$.

Gauging pulse generator 1305 and two OR gates 1301 and 1302 are shown again in FIG. 5. The operation mode selection is made by the application, via the micro-processor of a 1 (measurement mode) or a 0 (calibration mode) along wire 1350. In the measurement mode, AND gates 1351, 1352, 1357 and 1358 are open. In the calibration mode, then AND gates 1353 and 1354 are open Just one of the two measurement and calibration channels will now be described since the second one is identical to the first.

Flip-flop 1361 receives measurement pulses $R_1$ or the gauging pulses and flips on their front edge. Shaper circuit 1365 produces a short negative pulse coinciding with this front positive edge of $R_1$ (or of the gauging pulse) which sets flip-flop 1369 to 1.

Flip-flop 1363 receives the clock pulses throughout the width of pulses $R_1$; it is mounted as a binary demultiplier and goes to 1 upon the second pulse received following the beginning of an interval $R_1$. Shaper circuit 1367 causes a short negative pulse to correspond with the flipping over of 1363 to 1. This short pulse throws flip-flop 1361 and 1369 back to zero. It can therefore be seen that flip-flop 1369 produces pulses $t_1$. Likewise, flip-flop 1370 produces pulses $t_2$ through flip-flops 1362 and 1364 whose role is identical to that of flip-flops 1361 and 1363 respectively and shaper circuits 1366 and 1368 whose role is identical to that of shaper circuits 1365 and 1367 respectively.

Flip-flop 1371 goes over to 1 when $t_1$ passes from 1 to 0 and flip-flop 1372 goes over to 1 when $t_2$ passes from 1 to 0. Exclusive OR gate 1370 gives a signal which is equal to 1 when flip-flops 1371 and 1372 are at different respective positions and equal to 0 when these two flip-flops are at the same position. This OR gate 1370 therefore produces pulses $t_0$.

The sign of the speed is given by flip-flops 1381 and 1382. If $R_1$ arrives before $R_2$, flip-flop 1381, prepositioned at 0, goes to 1 upon the arrival of the front edge of $R_1$ and the control input of flip-flop 1382 is then 0. Upon the arrival of the front edge of $R_2$, flip-flop 1382 remains at 0. If $R_2$ arrives before $R_1$, flip-flop 1382 prepositioned at 0 and whose control input is at 1 through flip-flop 1381, goes over to 1 upon the arrival of the front edge of $R_2$. The arrival of $R_1$ has no effect.

We claim:

1. A device for measuring the flow of a fluid in a tube comprising:
    two ultrasonic electro-acoustic transducers in said tube, spaced apart from each other along a line oblique with respect to the tube axis;
    pulse generating means for respectively energizing said transducers with first and second transmitted electrical pulse groups having a recurrent frequency between pulses in each group;
    said transducers producing first and second received electrical pulse groups at said recurrent frequency responsive to reception by each transducer of an acoustic pulse group from the other transducer;
    frequency divider means connected to said pulse generating means and said transducers for dividing the recurrent frequency of the first and second transmitted and received electrical pulse groups by a given factor d for respectively converting each pulse of each group of pulses into a respective pulse train characterized by said d factor;
    circuit measuring means for measuring a first delay between the beginning of the first transmitted pulse train and the first received pulse train and for measuring a second delay between the beginning of the second transmitted pulse train and the beginning of the second received pulse train;
    said circuit measuring means further measuring a third delay between the beginnings of the first and second received pulse trains and also measuring a fourth delay between the beginnings of the first and second transmitted pulse trains;
    flip-flop means for subtracting the fourth delay from the third delay to thereby obtain a corrected delay; and
    said circuit measuring means dividing said corrected delay by the product of said first and second delay to provide a result which is proportional to the fluid flow.

2. A device for measuring the flow of a fluid in a tube as set forth in claim 1 wherein said circuit measuring means comprises:
    clock means producing clock pulses;
    integrator means providing an integer delay part;
    counting means for counting the clock pulses during the integer delay part of the count which includes a fractional delay part and an integer delay part, the output of said counting means being proportional to said integer delay part;
    first constant current integrator means activated during the first fractional delay part, the output of said first constant current integrator means being proportional to the first fractional delay part;
    second constant current integrator means activated during the second fractional delay part, the output of said second constant current integrator means being proportional to the second fractional delay part; and
    means for algebraically combining the outputs of said counting means and first and second constant current integrator means outputs.

3. A device for measuring the flow of a fluid in a tube as set forth in claim 1 wherein said circuit measuring means comprises:
    clock means producing clock pulses;
    integrator means providing an integer delay part;
    counting means for counting the clock pulses during the integer delay part of the count which includes a fractional delay part, the output of said counting means being proportional to said integer delay part;
    integrator means to provide an output which is proportional to the first fractional delay part; and
    an output which is proportional to the second fractional delay part for each of the pulse trains.

* * * * *